Figure 1A:
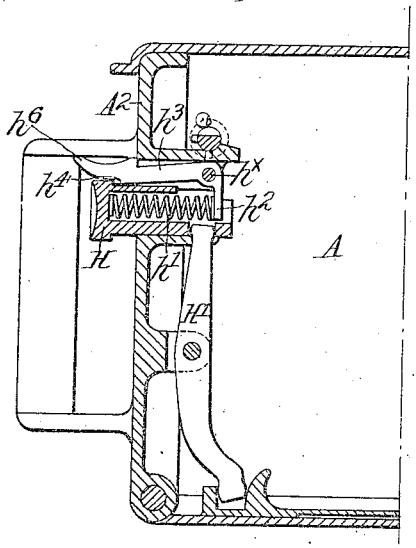

No. 772,700. PATENTED OCT. 18, 1904.
A. T. DAWSON & L. SILVERMAN.
AUTOMATIC GUN.
APPLICATION FILED MAR. 12, 1904.
NO MODEL. 4 SHEETS—SHEET 1.
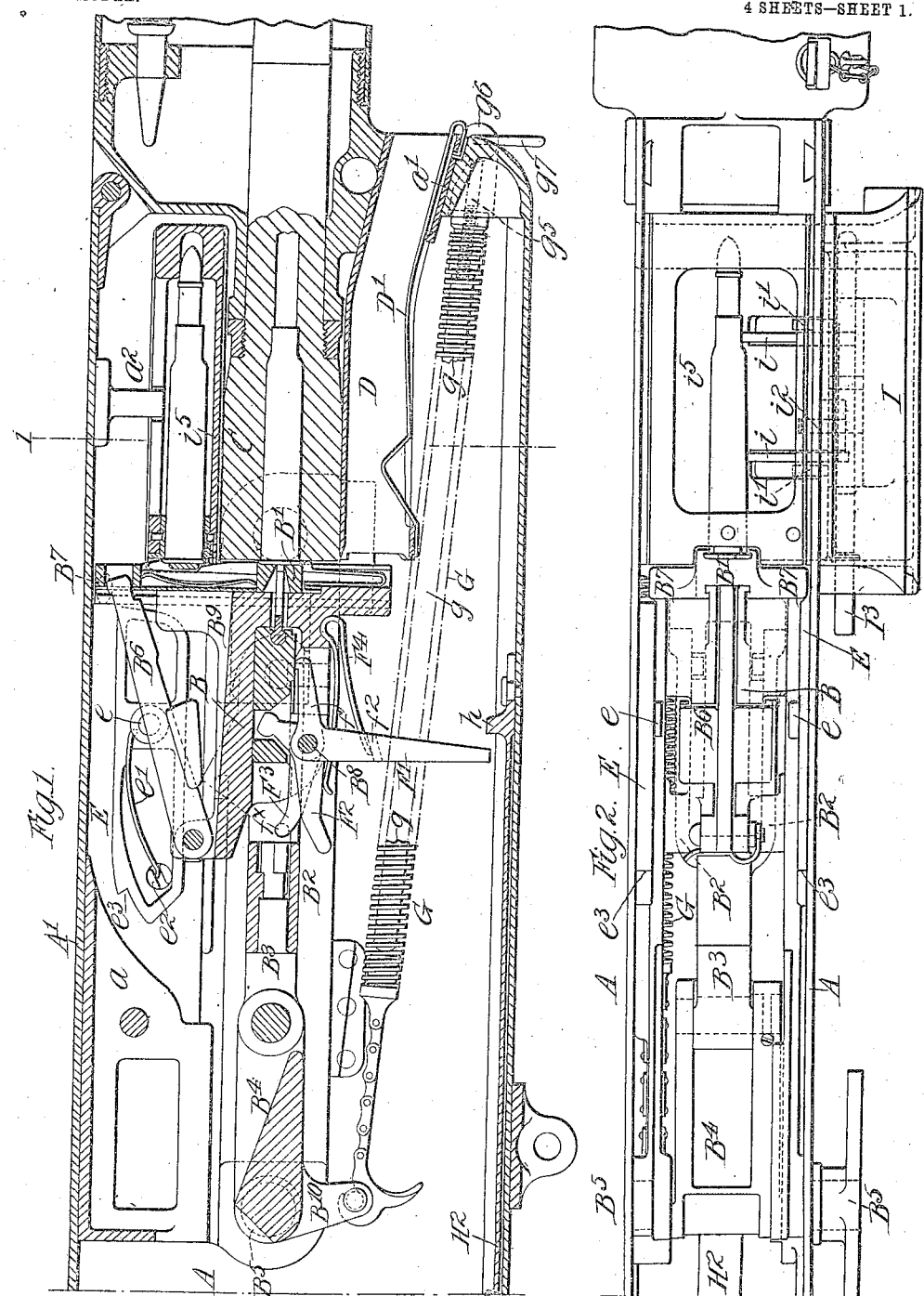
Witnesses:
Inventors
Arthur T. Dawson
Louis Silverman No. 772,700. PATENTED OCT. 18, 1904.
A. T. DAWSON & L. SILVERMAN.
AUTOMATIC GUN.
APPLICATION FILED MAR. 12, 1904.
NO MODEL. 4 SHEETS—SHEET 2.

Witnesses:

Inventors
Arthur T. Dawson
Louis Silverman

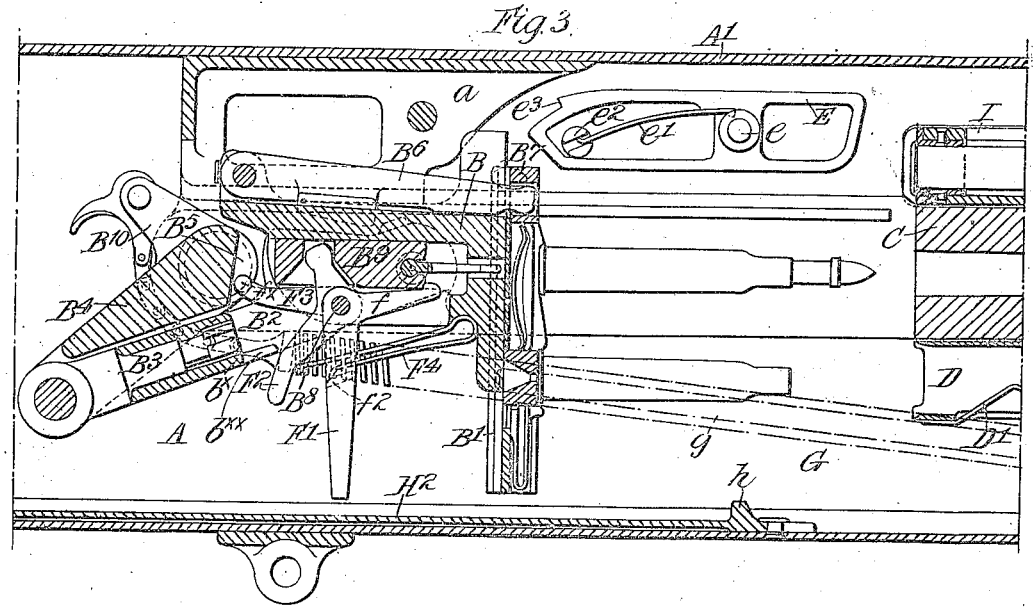
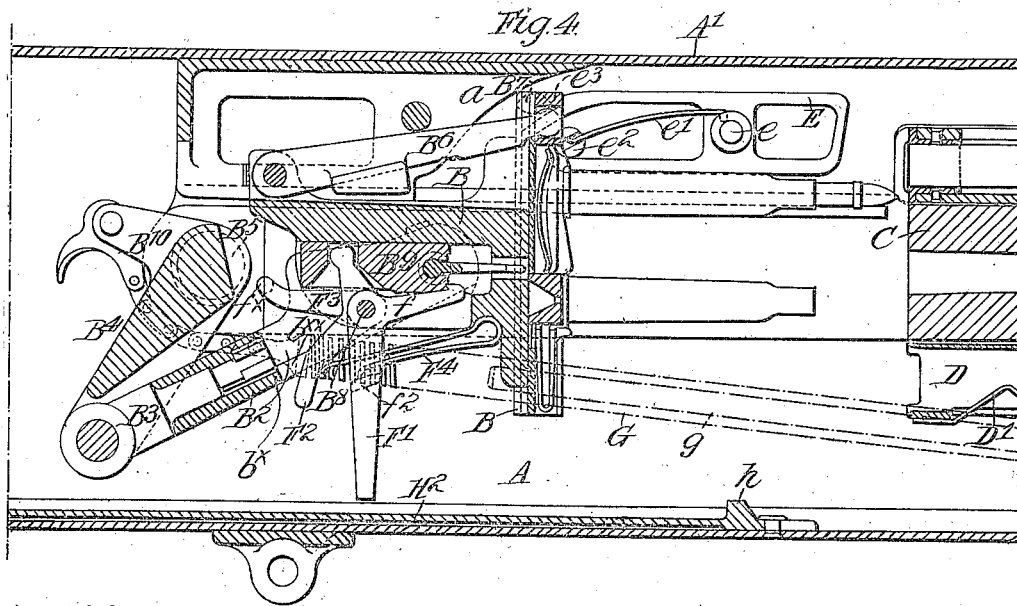

No. 772,700. PATENTED OCT. 18, 1904.
A. T. DAWSON & L. SILVERMAN.
AUTOMATIC GUN.
APPLICATION FILED MAR. 12, 1904.
NO MODEL. 4 SHEETS—SHEET 4.
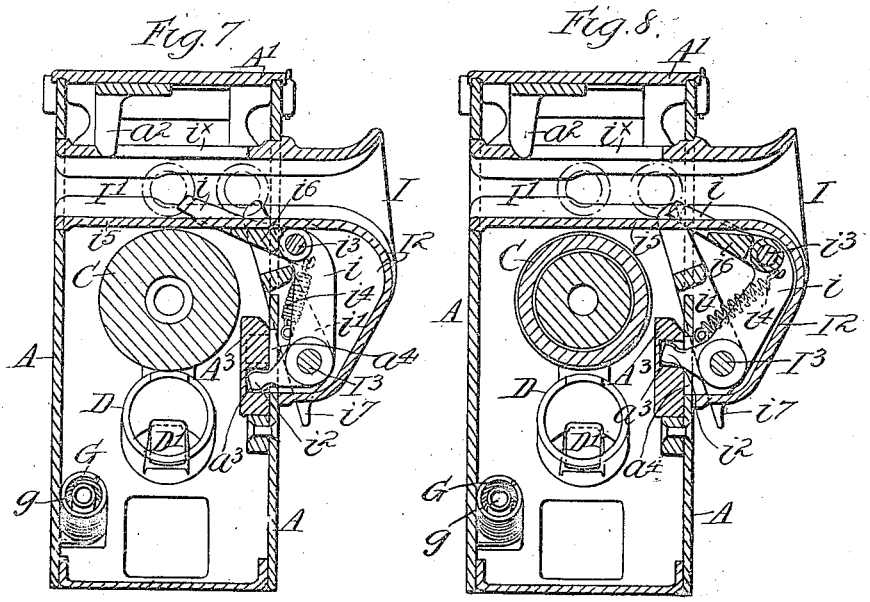
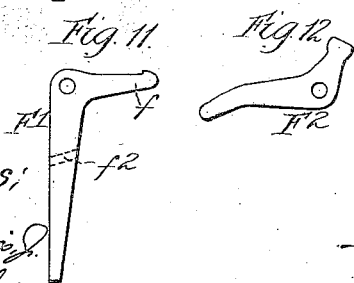
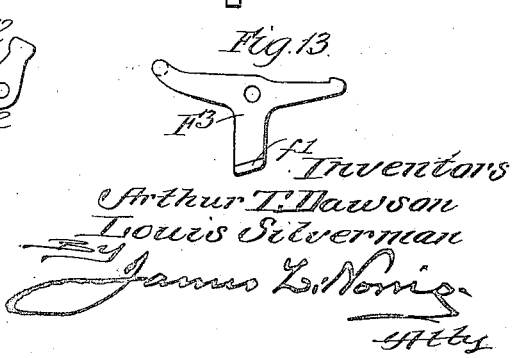
Witnesses:
Inventors
Arthur T. Dawson
Louis Silverman

UNITED STATES PATENT OFFICE.

ARTHUR TREVOR DAWSON AND LOUIS SILVERMAN, OF WESTMINSTER, ENGLAND, ASSIGNORS TO VICKERS SONS & MAXIM, LIMITED, OF WESTMINSTER, ENGLAND.

AUTOMATIC GUN.

SPECIFICATION forming part of Letters Patent No. 772,700, dated October 18, 1904.

Application filed March 12, 1904. Serial No. 197,884. (No model.)

*To all whom it may concern:*

Be it known that we, ARTHUR TREVOR DAWSON, lieutenant of the Royal Navy, director and superintendent of ordnance works, and LOUIS SILVERMAN, engineer, both subjects of the King of Great Britain, residing at Vickers Sons & Maxim, Limited, 32 Victoria street, Westminster, in the county of London, England, have invented certain new and useful Improvements Relating to Automatic Guns, of which the following is a specification.

The present improvements relate to breech-loading guns of the kind that are provided with breech mechanism working on the well-known Maxim principle now generally adopted in the services for rifle-caliber and other automatic guns—that is to say, the breech mechanism comprises a reciprocating lock coupled with an oscillatory crank-shaft by means of side levers and a connecting-rod, said shaft receiving its motion in one direction by the energy of recoil and in the other direction by the reaction of a spring. A sliding cartridge-carrier on the lock operates during the rearward stroke of the latter to withdraw the empty cartridge-case from the barrel and a fresh cartridge from a cartridge-belt, and during the forward stroke of the lock said carrier operates to insert the fresh cartridge into the barrel and eject the empty cartridge-case into the ejector-tube, the said cartridge-belt being meanwhile caused by the action of suitable feed mechanism to move forward through the gun a sufficient distance to bring another cartridge into proper position for the said carrier to engage therewith ready to withdraw it at the next rearward stroke of the lock.

One part of our invention has reference to the means employed for preventing the return movement of the lock if it should for any reason fail to accomplish its full rearward stroke, so that the projectile of the cartridge withdrawn from the cartridge-belt by the carrier cannot strike the cap or detonator of the succeeding cartridge brought forward by the belt for the next charge, as explained in the specification of our prior patent, No. 19,714 of the year 1898. According to our present improvements we make the inside cams, which guide the lateral projections or horns of the carrier during the reciprocation of the lock, capable of movement in a vertical plane against the resistance of springs and provide the said cams with notches or shoulders, which coöperate with the aforesaid horns on the carrier in such manner that if the lock should not complete its rearward stroke and should tend to return under the action of the recoil-spring the said notches or shoulders will act as stops and restrain the forward movement of the lock.

According to another part of our invention we provide the lock with a transverse axle upon which three levers or arms are mounted, one acting as the sear, another acting as the cocking-arm for the firing-pin, and the other acting as the safety-sear, a mainspring being provided and so arranged that it is common to the aforesaid three arms, so that the same spring serves for all of them.

According to another part of our invention the forward end of the recoil-spring is adjustably connected to the gun-casing by means of a screw, having at its outer end a cylindrical or flattened spherical head carrying a ring or the like for actuating the same. The gun-casing is provided with a groove or recess with which said head and ring are capable of engaging under the tension of the recoil-spring when the adjustment has been effected, thereby preventing said screw from being unintentionally turned or working loose by the vibration due to the firing of the gun and yet permitting of the spring turning in a vertical plane when its rear end is being detached from or attached to the breech mechanism.

According to another part of our invention the push-piece which coöperates with a lever hinged to the rear plate of the gun-casing for actuating the trigger-bar to fire the gun has a spring which engages with a tail formed on the forward end of a locking-arm. This locking-arm is hinged to the said rear plate of the gun-casing and prevents the push-piece from being actuated to fire the gun until shifted from its restraining position.

According to another part of our invention the feed-block has a horizontal channel or guide for the cartridge-belt, which guide fits into openings in the side plates of the gun-casing by a longitudinal movement of said guide. The lower portion of the feed-block, immediately below the mouth of the guide, is formed with a hollow portion or casing, within which we arrange the feed and retaining pawls for the belt, said pawls being constructed and operating as hereinafter described.

In order that our said invention may be clearly understood and readily carried into effect, we will describe the same more fully with reference to the accompanying drawings, in which—

Figure 2A:
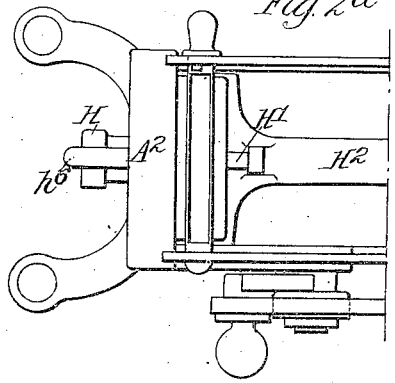

Figure 1 is a vertical section of the rear part or casing of a .45 automatic gun constructed in accordance with our invention, the breech mechanism being shown in the position it assumes when the breech is closed and the gun fired. Fig. 1ª is a part of Fig. 1. Fig. 2 is a plan with the hinged cover-plate removed. Fig. 2ª is a part of Fig. 2. Figs. 3 and 4 are vertical sections of the breech mechanism, showing the same respectively in the position it occupies when the lock has been fully retracted and when said lock has been only partially retracted and is restrained from returning toward the breech. Fig. 5 is a detail sectional view, and Fig. 6 an end view, of the front part of the said recoil-spring and its screw-fastening for attaching it to the gas-casing. Figs. 7 and 8 are cross-sections taken approximately on the line 1 1 of Fig. 1 and showing the cartridge-belt feed mechanism in two positions. Fig. 9 is an elevation, and Fig. 10 an end view, of the sear, the cocking-arm, and the safety-sear, together with their spring, shown more clearly than in the other figures. Figs. 11, 12, and 13 show the said sear, the cocking-arm, and the safety-sear separately.

A A are the side plates of the gun-casing, that inclose the breech mechanism. A′ is the hinged cover of said casing, and A² the hinged rear plate.

B is the reciprocating lock; B′, the sliding cartridge-carrier thereon.

B² B² are the side levers of the connecting-rod B³, by which the lock is coupled with the crank B⁴ of the oscillatory crank-shaft B⁵.

B⁶ is the hinged lever for actuating the sliding carrier.

C is the barrel.

D is the ejector-tube, and D′ the ejector-spring.

E E are the inside cams, which guide the lateral projections or horns B⁷ of the sliding carrier during the reciprocation of the lock.

B⁸ is the transverse axle on the lock-casing, carrying the three arms F′ F² F³.

G is the recoil-spring.

H is the push-piece, which coöperates with the lever H′ for actuating the trigger-bar H² to fire the gun.

I is the cartridge-belt feed-block.

Each of the inside cams E is pivoted at $e$ to the side plates A of the gun-casing, so as to move about said pivot in a vertical plane against the resistance of the spring $e'$, which normally tends to keep the rear end of the cam pressed upwardly against a stop $e^2$ on the said side plate A. Near the rear end of the cam is a notch or shoulder $e^3$. As the lock recedes from the barrel the horns B⁷ of the cartridge-carrier press upon the upper surface of the cams by the action of a cam $a$ on the cover A′ in the usual manner, and as said horns pass over the shoulders $e^3$ they depress the rear ends of the cams E by turning them about the pivots $e$, the said cams rising again to their normal position under the action of the springs $e'$ and bringing the said shoulders $e^3$ in front of the horns. In the event, therefore, of the lock not fully completing its rearward stroke and tending to advance again under the influence of the recoil-spring G these shoulders act as stops, as represented in Fig. 4, and prevent the lock from advancing toward the barrel, as aforesaid.

The said levers or arms F′ F² F³ are mounted loosely on the axle B⁸, carried by the lock-casing. The lever or arm F′ has a sear $f$, engaging with the firing-pin B⁹, and a depending tail, which lies in a position to be acted upon by a projection $h$ on the trigger-bar H² when the latter is actuated by the push-piece H to fire the gun, thus acting as the firing-sear. The lever or arm F² has a forward portion that likewise engages with the firing-pin and also has a rearward extension or tail which is actuated by the portion $b^\times$ of the side levers as the lock performs its rearward stroke, thus cocking the firing-pin, and therefore acting as the cocking-arm. The lever or arm F³ has a forward portion that engages with the firing-pin and has a rearward extension terminating in a lug $f^\times$, with which the projection $b^\times$ of the side levers impinges to disengage the firing-pin as the connecting-rod straightens and the lock completes its forward movement, thus serving as a safety-sear. This lever or arm also has a depending piece terminating in a lateral projection or ledge $f'$. The aforesaid depending tail of the arm F′ also has a similar lateral projection or ledge $f^2$. Upon these two ledges $f'$ $f^2$ the divided lower limb of the spring F⁴ bears, the upper member thereof bearing against the under side of the rearward extension of the arm F². Thus these three levers or arms are subject to the pressure of a single spring.

The recoil-spring G has a core $g$ for limiting the extent of its contraction when its outer or rear end is detached from the breech mechanism. The forward end of said core has the adjustable screw $g^5$, which is provided with the cylindrical head $g^6$, having the ring $g^7$ for turning the screw. The gun-casing has a recess $a'$ for the reception of the said head and its ring when the latter is turned into the position shown in Fig. 1, whereby the screw is locked in its adjusted position, the said head of the screw nevertheless serving as a pivot about which the spring and its core can turn in a vertical plane.

The push-piece H is made hollow to contain the spring $h'$, one end of which abuts against the rear of the push-piece and the other end against the tail $h^2$ of the locking-arm $h^3$, which is hinged at $h^\times$. This locking-arm has a shoulder $h^4$ and a thumb-piece $h^6$. In its normal position, which is that shown in Fig. 1, the shoulder $h^4$ engages with a shoulder on the push-piece by the action of its spring $h'$, thus preventing said push-piece from being actuated. When, however, the locking-arm is moved upward about its pivot $h^\times$, it releases the push-piece, which is then free to be actuated to fire the gun. On releasing the push-piece it is returned to its original position by the spring $h'$, which at the same time acts on the tail $h^2$ of the locking-arm $h^3$, thereby causing the latter to turn downward about its pivot and bring its shoulder $h^4$ in front of the shoulder of the push-piece, thus locking the said push-piece and preventing the accidental actuation thereof.

The cartridge-belt feed-block and its mechanism are illustrated by Figs. 7 and 8. The said feed-block has the channel or guide I', adapted to enter the gun by a longitudinal movement thereof—that is to say, instead of vertically slotting the side plates A A of the gun-casing, as heretofore, in order to enable the feed-block to be placed in position by a downward movement thereof and retaining said block in place by the hinged cover of the gun-casing closing the open upper ends of said vertical slots, we make the said side plates with two rectangular holes situated opposite each other, with which holes the feed-block engages by a lateral movement, the block being retained in place by a projection $a^2$ on the hinged cover A' engaging with a slot $i^\times$ in the upper face of the said guide I'. By reason of these holes being completely surrounded with a margin of metal the strength of the side plates A is not so much diminished as when said side plates are formed with the usual vertical slots, that of necessity have no margin of metal along their upper parts. I² is the hollow portion or casing of the feed-block, provided with an axle I³, carrying the feed-pawl $i$ and the retaining-pawl $i''$, both of which are of Y shape. The said feed-pawl $i$ has an arm $i^2$ at its lower part, which projects through an opening $a^4$ in one of the side plates of the gun-casing and engages with an oblique slot $a^3$, formed in the adjacent recoil-plate A³, so that the movement of said recoil-plate transmits the necessary motion to the feed-pawl for actuating the cartridge-belt. The said feed-pawl $i$ is made in two parts hinged together at $i^3$, and a spring $i^4$ couples the lower hinged portion to the retaining-pawl $i''$, whereby said feed-pawl and retaining-pawl are rendered flexible in the direction of the feed movement of the belt. The lower side $i^5$ of the guide of the feed-block is suitably slotted to enable the upper or free ends of the feed and retaining pawls to project into the said guide for operating on the belt. The upper portion of the feed-pawl is guided in its movements by a projection $i^6$ thereon engaging with the under side of the guide of the feed-block. The lower or outer end of the retaining-pawl has a tail $i^7$, which projects through an opening in the aforesaid casing I² of the feed-block, so as to enable said retaining-pawl to be shifted from its retaining position relatively to the said belt when the latter is required to be withdrawn from the feed-opening of the block, it being understood that as the cartridge in the pocket of the feed-belt immediately in front of the feed-pawl $i$ has been previously removed by the cartridge-carrier no undue impediment to the withdrawal of the belt is exerted by said feed-pawl. The axle I³, upon which the said pawls are mounted, may be split and may have its outer end so shaped that the split members thereof can be caused to approach by pressure exerted thereon with the gunner's fingers when it is desired to remove said axle from the feed-block.

What we claim, and desire to secure by Letters Patent of the United States, is—

1. In an automatic gun, the combination with a reciprocating lock, a recoil-spring and a connecting-rod coupling said lock to a crank-shaft; of a cartridge-carrier sliding on said lock, horns on said carrier, movable cams on the side plates of the gun-casing with which cams said horns coöperate, shoulders on said movable cams, and means whereby the cams are depressed by the rearward movement of the lock and regain their normal position after the horns have passed said shoulders for the purpose specified.

2. In an automatic gun, the combination with a reciprocating lock, a recoil-spring, and a connecting-rod coupling said lock to a crank-shaft, of a cartridge-carrier sliding on said lock, horns on said carrier, pivoted cams on the side plates of the gun-casing with which cams said horns coöperate, shoulders on said movable cams, and springs adapted to permit the cams to be depressed as the lock recedes and to cause said cams to regain their normal position after the horns have passed said shoulders, for the purpose specified.

3. In an automatic gun, the combination with a reciprocating lock and a connecting-rod coupling said lock to a crank-shaft, of a helical recoil-spring, a rigid strut surrounded by said spring, a screw-nut at the forward end of said spring, a cylindrical head adapted to fit a corresponding recess in the gun-casing so as to form a pivot for said spring, a screw-stem on said head engaging with the said nut, and means for disengaging said head from said recess and turning it to adjust the screw-stem in the nut substantially as described.

4. In an automatic gun, the combination with a reciprocating lock, a recoil-spring, a connecting-rod coupling said lock to a crank-shaft, a firing-pin in said lock, a sear for liberating said pin to fire the gun, and a trigger-bar for actuating said sear; of a push-piece coupled to said trigger-bar by a pivoted lever, a spring in said push-piece, a hinged locking-arm having a tail which is acted on by said spring for normally keeping the hinged locking-arm in a position to stop the movement of the push-piece, and means for liberating said hinged locking-arm substantially as described.

5. In an automatic gun, the combination with a reciprocating lock, a recoil-spring, a connecting-rod coupling said lock to a crank-shaft, and a firing-pin in said lock; of a firing-sear, a retaining-sear, and a cocking-arm all mounted on the same axle of the lock, and a single spring for controlling the said sears and cocking-arm substantially as described.

6. In an automatic gun, the combination with a reciprocating lock, a recoil-spring, a connecting-rod coupling said lock to a crank-shaft and a sliding cartridge-carrier on said lock; of a cartridge-belt feed-block having a cartridge-belt guide adapted to enter side openings in the gun-casing by a lateral movement thereof, a hollow portion or chamber below the mouth of the said block, a belt feed-pawl located within said chamber and made in two articulated portions, a retaining-pawl also located within said chamber and connected by a spring with the portion of the feed-pawl nearest its fulcrum, an arm on the last-mentioned portion of the feed-pawl engaging with an oblique slot in one of the recoil-plates of the gun, and a stop or projection on the hinged cover of the gun-casing for retaining the block in place substantially as described.

In testimony whereof we have hereunto set our hands, in presence of two subscribing witnesses, this 29th day of February, 1904.

ARTHUR TREVOR DAWSON.
LOUIS SILVERMAN.

Witnesses:
JOHN J. SHIELDS,
C. A. SEARLE.